(12) United States Patent
Yamamoto

(10) Patent No.: US 8,106,558 B2
(45) Date of Patent: Jan. 31, 2012

(54) THREE-PHASE MAGNETO GENERATOR AND TRANSPORT APPARATUS

(75) Inventor: Jun Yamamoto, Shizuoka (JP)

(73) Assignee: Yamaha Motor Electronics Co., Ltd., Shizuoka (JP)

( * ) Notice: Subject to any disclaimer, the term of this patent is extended or adjusted under 35 U.S.C. 154(b) by 188 days.

(21) Appl. No.: 12/559,572

(22) Filed: Sep. 15, 2009

(65) Prior Publication Data
US 2010/0072853 A1 Mar. 25, 2010

(30) Foreign Application Priority Data
Sep. 19, 2008 (JP) .................. 2008-241797

(51) Int. Cl.
*H02K 21/00* (2006.01)
*H02K 3/00* (2006.01)
(52) U.S. Cl. ......... 310/179; 310/180; 310/198; 310/208
(58) Field of Classification Search .................. 310/195, 310/179, 180, 184, 185, 198, 208
See application file for complete search history.

(56) References Cited

U.S. PATENT DOCUMENTS

| | | | | |
|---|---|---|---|---|
| 3,978,356 A | * | 8/1976 | Spiesberger | 310/156.42 |
| 7,038,348 B2 | * | 5/2006 | Takase et al. | 310/216.008 |
| 2002/0074887 A1 | | 6/2002 | Takano et al. | |
| 2006/0097599 A1 | | 5/2006 | Takeuchi | |

FOREIGN PATENT DOCUMENTS

| | | |
|---|---|---|
| EP | 1 091 476 A2 | 4/2001 |
| EP | 1 505 714 A1 | 2/2005 |
| JP | 62-025853 A | 2/1987 |
| JP | 62-166756 A | 7/1987 |
| JP | 2001-112226 A | 4/2001 |
| JP | 3680213 B2 | 8/2005 |
| JP | 2005-261046 A | 9/2005 |
| JP | 2006-136080 A | 5/2006 |
| JP | 3995450 B2 | 10/2007 |
| WO | 03/098781 A1 | 11/2003 |

* cited by examiner

*Primary Examiner* — Quyen Leung
*Assistant Examiner* — Leda Pham
(74) *Attorney, Agent, or Firm* — Keating & Bennett, LLP

(57) ABSTRACT

A plurality of permanent magnets are provided at a rotor at equal angular intervals. A plurality of magneto coils are provided at a stator at unequal angular intervals. The number of the plurality of magneto coils is not a multiple of three. The plurality of magneto coils include U-phase magneto coils, V-phase magneto coils and W-phase magneto coils. The U-phase magneto coils are arranged and connected such that phases of currents passing through the U-phase magneto coils are equal. The V-phase magneto coils are arranged and connected such that phases of currents passing through the V-phase magneto coils are equal. The W-phase magneto coils are arranged and connected such that phases of currents passing through the W-phase magneto coils are equal.

12 Claims, 7 Drawing Sheets

F I G. 1
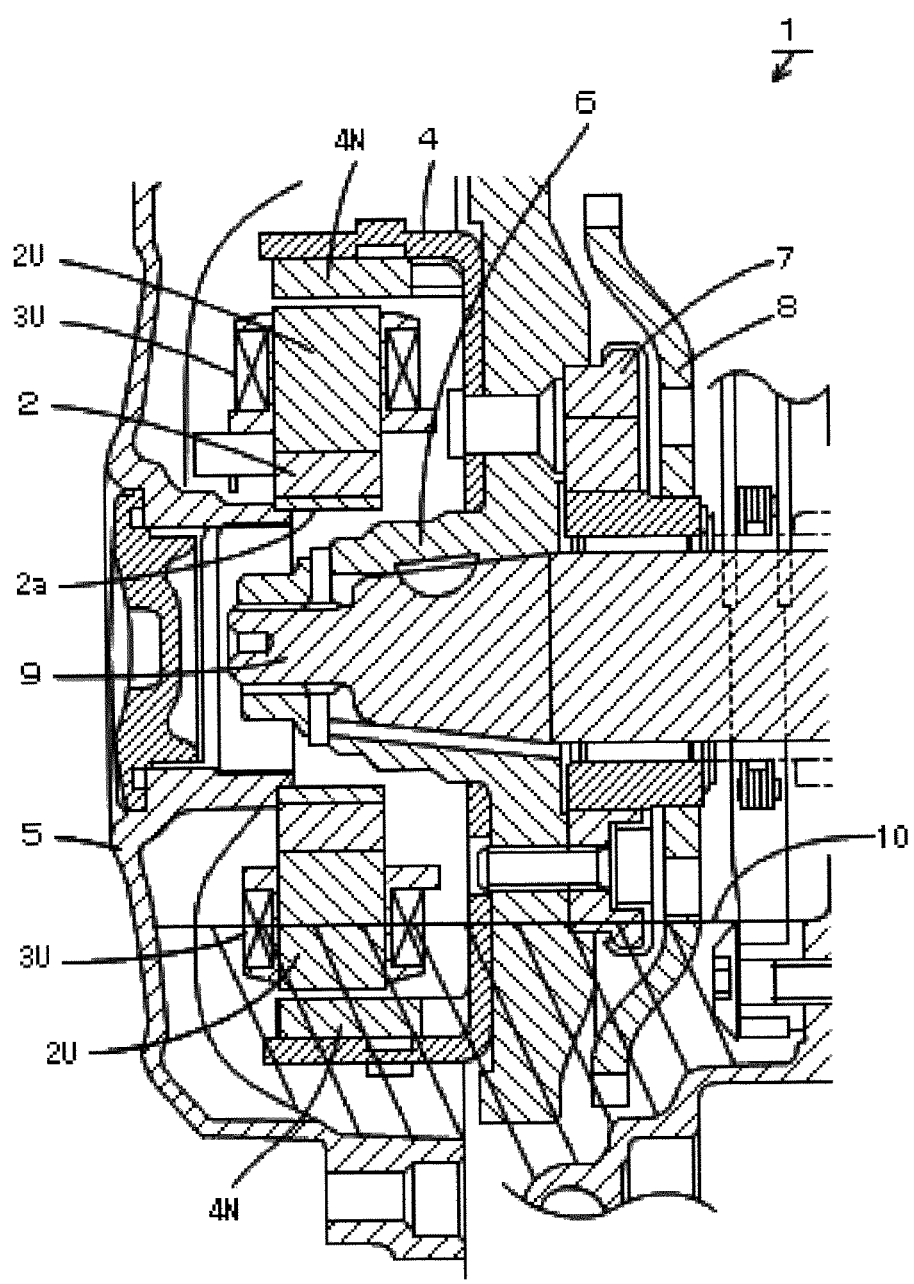

F I G. 3
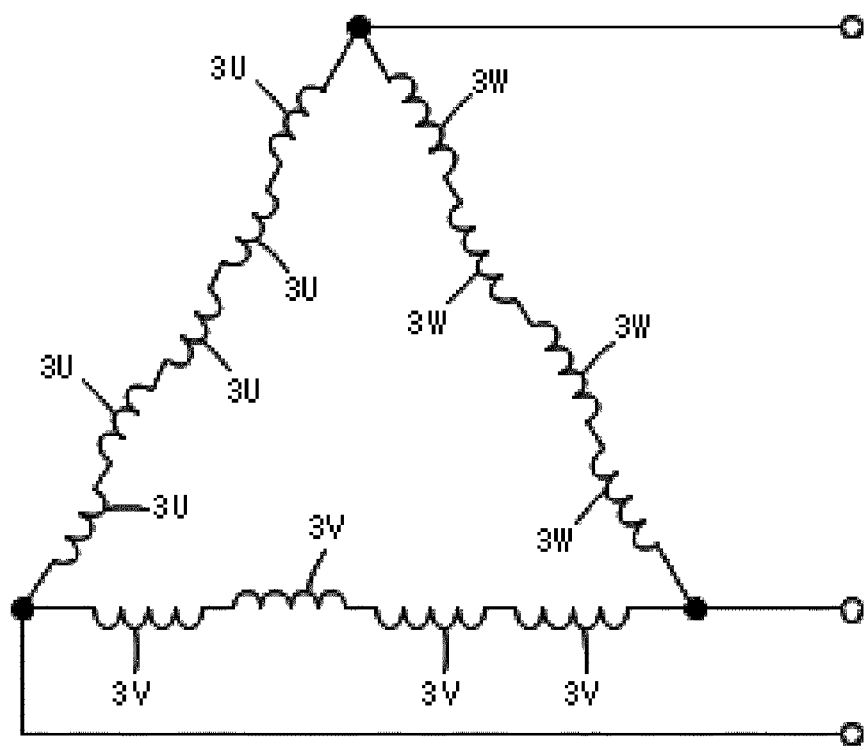

F I G. 6
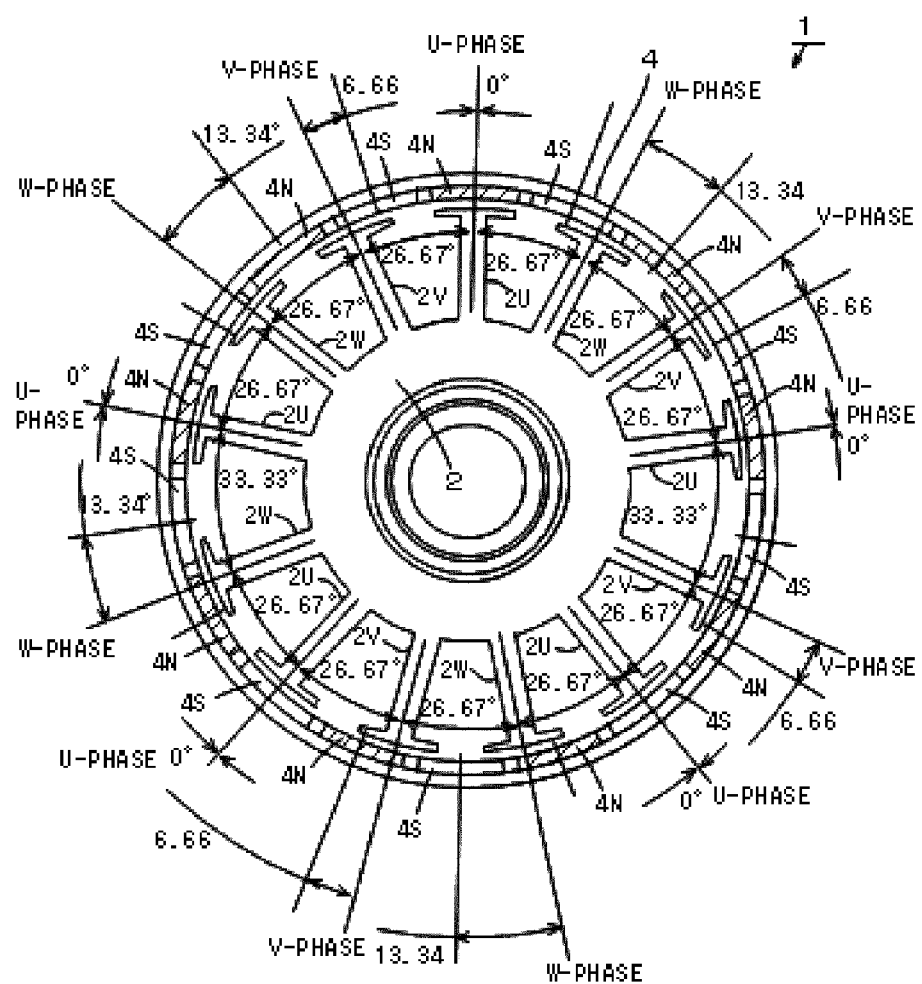

THREE-PHASE MAGNETO GENERATOR AND TRANSPORT APPARATUS

BACKGROUND OF THE INVENTION

1. Field of the Invention

The present invention relates to a three-phase magneto generator and a transport apparatus including the same.

2. Description of the Background Art

A motorcycle is provided with an alternating current magneto generator. The alternating current magneto generator includes a stator and a rotor. In general, a plurality of magneto coils are attached to the stator at equal angular intervals. In general, a plurality of permanent magnets are attached to the rotor at equal angular intervals. The rotor integrally rotates with a crankshaft of an engine. Thus, a rotating magnetic field generated by the plurality of permanent magnets induces voltage in the plurality of magneto coils of the stator.

A three-phase magneto generator having 4n permanent magnets and 3n magneto coils is described in JP 3680213 B, where n is an arbitrary integer. In the three-phase magneto generator, a sufficient output current is obtained when a rotational speed of the engine is low, and the output current is suppressed when the rotational speed of the engine is high.

In the foregoing conventional three-phase magneto generator, however, the temperature of the magneto coils increases in a high rotational speed region. This leads to shorter lives of the magneto coils. Recently, suppression of heat generation in the three-phase magneto generator has been required.

SUMMARY OF THE INVENTION

In order to overcome the problems described above, preferred embodiments of the present invention provide a three-phase magneto generator in which heat generation is sufficiently minimized and prevented, and a transport apparatus including the same.

According to a preferred embodiment of the present invention, a three-phase magneto generator includes a stator, a rotor rotatably arranged relative to the stator, a plurality of permanent magnets provided at the rotor at equal angular intervals, and a plurality of magneto coils provided at the stator at unequal angular intervals, wherein the number of the plurality of magneto coils is not a multiple of three, the plurality of magneto coils include a plurality of first coils through which first phase currents pass, a plurality of second coils through which second phase currents pass, and a plurality of third coils through which third phase currents pass, and the plurality of first coils are arranged and connected such that phases of the currents passing through the plurality of first coils are equal, the plurality of second coils are arranged and connected such that phases of the currents passing through the plurality of second coils are equal, and the plurality of third coils are arranged and connected such that phases of the currents passing through the plurality of third coils are equal.

In the three-phase magneto generator, the number of the plurality of magneto coils is not a multiple of three, and the plurality of magneto coils are arranged at the unequal angular intervals. Therefore, the interval between adjacent magneto coils is wide in some portions, and the interval between adjacent magneto coils is narrow in other portions.

In addition, the plurality of first coils are arranged and connected such that the phases of the currents passing through the plurality of first coils are equal, the plurality of second coils are arranged and connected such that the phases of the currents passing through the plurality of second coils are equal, and the plurality of third coils are arranged and connected such that the phases of the currents passing through the plurality of third coils are equal.

Thus, output current characteristics can be maintained and heat generation of the magneto coils can be minimized and prevented.

The plurality of first coils may be arranged at angular intervals, each of which is an integral multiple of the angular interval between the permanent magnets, the plurality of first coils may be connected such that the phases of the currents passing through the plurality of first coils are equal while each of the first coils is opposite to any of the plurality of permanent magnets, the plurality of second coils may be arranged in positions that are different from positions of the plurality of first coils at angular intervals, each of which is an integral multiple of the angular interval between the permanent magnets, and the plurality of second coils may be connected such that the phases of the currents passing through the plurality of second coils are equal while each of the second coils is opposite to any of the plurality of permanent magnets, and the plurality of third coils may be arranged in positions that are different from the positions of the plurality of first and second coils at angular intervals, each of which is an integral multiple of the angular interval between the permanent magnets, and the plurality of third coils may be connected such that the phases of the currents passing through the plurality of third coils are equal while each of the third coils is opposite to any of the plurality of permanent magnets.

In this case, the phases of the currents passing through the plurality of first coils are reliably equalized. Moreover, the phases of the currents passing through the plurality of second coils are reliably equalized. Furthermore, the phases of the currents passing through the plurality of third coils are reliably equalized.

The plurality of magneto coils may be arranged such that when each of the plurality of first coils is opposite to any of the plurality of permanent magnets, each of the plurality of second coils may be in a position shifted in one direction by an angle of about 1/3 of the angular interval between the permanent magnets from a position opposite to any of the plurality of permanent magnets, and each of the plurality of third coils may be in a position shifted in the one direction by an angle of about 2/3 of the angular interval between the permanent magnets from a position opposite to any of the plurality of permanent magnets.

In this case, the phases of the currents passing through the plurality of first coils, the phases of the currents passing through the plurality of second coils, and the phases of the currents passing through the plurality of third coils are different from one another by 120 degrees. This results in well-balanced phases of a three-phase alternating current.

The number of the plurality of first coils and the number of the plurality of second coils may be equal, the number of the plurality of third coils may be less than each of the number of the plurality of first coils and the number of the plurality of second coils, and the number of turns of each of the plurality of first coils and the number of turns of each of the plurality of second coils may be equal, and the number of turns of each of the plurality of third coils may be more than each of the number of turns of each of the plurality of first coils and the number of turns of each of the plurality of second coils.

In this case, the total numbers of turns of the plurality of first coils, the plurality of second coils and the plurality of third coils can be substantially equalized. This equalizes electric generating capacities of the first-phase magneto coils, the second-phase magneto coils and the third-phase magneto coils.

The number of the plurality of second coils and the number of the plurality of third coils may be equal, and the number of the plurality of second coils and the number of the plurality of third coils may be each less than the number of the plurality of first coils, and the number of turns of each of the plurality of second coils and the number of turns of each of the plurality of third coils may be equal, and the number of turns of each of the plurality of second coils and the number of turns of each of the plurality of third coils may be each more than the number of turns of each of the plurality of first coils.

In this case, the total numbers of turns of the plurality of first coils, the plurality of second coils and the plurality of third coils can be substantially equalized. This equalizes the electric generating capacities of the first-phase magneto coils, the second-phase magneto coils and the third-phase magneto coils.

The plurality of permanent magnets may include a plurality of first permanent magnets having N poles being opposite to the plurality of magneto coils and a plurality of second permanent magnets having S poles being opposite to the plurality of magneto coils, a direction of turns of each first magneto coil being opposite to any of the plurality of first permanent magnets may be different from a direction of turns of each first magneto coil being opposite to any of the plurality of second permanent magnets while each of the plurality of first magneto coils is opposite to any of the plurality of permanent magnets, a direction of turns of each second magneto coil being opposite to any of the plurality of first permanent magnets may be different from a direction of turns of each second magneto coil being opposite to any of the plurality of second permanent magnets while each of the plurality of second magneto coils is opposite to any of the plurality of permanent magnets, and a direction of turns of each third magneto coil being opposite to any of the plurality of first permanent magnets may be different from a direction of turns of each third magneto coil being opposite to any of the plurality of second permanent magnets while each of the plurality of third magneto coils is opposite to any of the plurality of permanent magnets.

In this case, the phases and the directions of the currents passing through the plurality of first coils can be equalized, the phases and the directions of the currents passing through the plurality of second coils can be equalized, and the phases and the directions of the currents passing through the plurality of third coils can be equalized without complicating connections among the plurality of first coils, connections among the plurality of second coils and connections among the plurality of third coils.

The number of the plurality of permanent magnets may be 2n, and the number of the plurality of magneto coils may be 3m−1 or 3m−2, where each of n and m is a natural number.

In this case, the output current characteristics in a low rotational speed region can be improved and output currents in a high rotational speed region can be minimized.

According to another preferred embodiment of the present invention, a transport apparatus includes a main body, an engine provided in the main body, a drive unit that moves the main body by rotation of the engine, and a three-phase magneto generator driven by the rotation of the engine, wherein the three-phase magneto generator includes a stator, a rotor rotatably arranged relative to the stator, a plurality of permanent magnets provided at the rotor at equal angular intervals, and a plurality of magneto coils provided at the stator at unequal angular intervals, wherein the number of the plurality of magneto coils is not a multiple of three, the plurality of magneto coils including a plurality of first coils through which first phase currents pass, a plurality of second coils through which second phase currents pass, and a plurality of third coils through which third phase currents pass, and the plurality of first coils being arranged and connected such that phases of the currents passing through the plurality of first coils are equal, the plurality of second coils being arranged and connected such that phases of the currents passing through the plurality of second coils are equal, and the plurality of third coils being arranged and connected such that phases of the currents passing through the plurality of third coils are equal.

In the transport apparatus, the drive unit moves the main body by the rotation of the engine. Moreover, the rotation of the engine causes the three-phase magneto generator to be driven.

In the three-phase magneto generator, the output current characteristics can be maintained and the heat generation of the magneto coils can be prevented. This allows for higher performance and higher functions of an electrical system of the transport apparatus.

Other features, elements, characteristics, steps and advantages of the present invention will become more apparent from the following description of preferred embodiments of the present invention with reference to the attached drawings.

BRIEF DESCRIPTION OF THE DRAWINGS

FIG. 1 is a sectional view of a three-phase magneto generator according to a preferred embodiment of the present invention.

FIG. 3 is a circuit diagram showing how magneto coils of the three-phase magneto generator of FIG. 1 are connected.

FIG. 6 is a front view of a three-phase magneto generator according to still another preferred embodiment of the present invention.

DETAILED DESCRIPTION OF THE PREFERRED EMBODIMENTS

Figure 2:
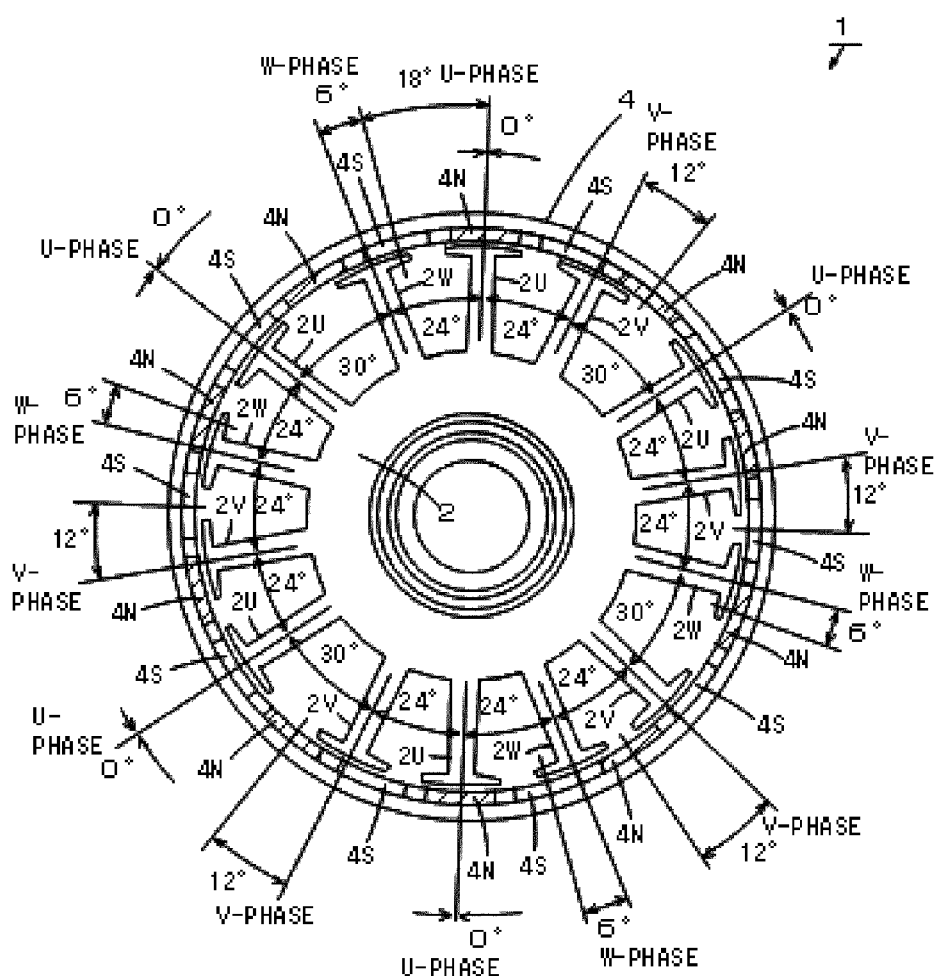
FIG. 2 is a front view of the three-phase magneto generator of FIG. 1.

Hereinafter, description is made of a three-phase magneto generator according to preferred embodiments of the present invention while referring to the drawings.

One Preferred Embodiment

FIG. 1 is a sectional view of a three-phase magneto generator according to one preferred embodiment of the present invention. FIG. 2 is a front view of the three-phase magneto generator of FIG. 1. FIG. 3 is a circuit diagram showing how magneto coils of the three-phase magneto generator of FIG. 1 are connected. The magneto coils are not shown in FIG. 2.

The three-phase magneto generator (hereinafter abbreviated as the generator) 1 shown in FIGS. 1 and 2 is driven by an engine of a motorcycle, for example.

The generator 1 includes a stator 2 and a rotor 4. The stator 2 has a central hole 2a and is fixed to the casing 5. The rotor 4 is arranged rotatably relative to the stator 2 with the central axis of the central hole 2a of the stator 2 as the center.

The casing 5 is fixed to a crankcase of the engine or a main body frame of a vehicle, such as a motorcycle, for example. An end of a crankshaft 9 of the engine is inserted into the central hole 2a of the stator 2 with play existing therebetween. A fastening member 6 is fixed to an outer peripheral surface of the end of the crankshaft 9. The rotor 4 has a cup-shape. The rotor 4 is fixed to an outer peripheral surface of the fastening member 6.

A one-way clutch 7 is provided at the fastening member 6. The one-way clutch 7 is provided with a gear 8 that transmits power of a starter (not shown) of the motorcycle. When the power of the starter is transmitted to the one-way clutch 7 through the gear 8, the rotor 4 integrally rotates with the crankshaft 9. In addition, when actuation of the engine causes the crankshaft 9 to rotate, the rotor 4 integrally rotates with the crankshaft 9. Engine oil 10 is held in a lower portion within the casing 5.

As shown in FIG. 2, the rotor 4 is provided coaxially with the stator 2. The stator 2 has an outer peripheral surface, and the rotor 4 has an inner peripheral surface. The radius of the outer peripheral surface of the rotor 4 is larger than the radius of the outer peripheral surface of the stator 2, and the outer peripheral surface of the stator 2 faces the inner peripheral surface of the stator 2.

A plurality of cores 2U, 2V, 2W are provided on the outer peripheral surface of the stator 2 to project outward. The plurality of cores 2U, 2V, 2W are arranged at unequal angular intervals with the central axis of the stator 2 as the center. Each core 2U is provided with a magneto coil 3U (see FIG. 3) through which a U-phase current passes. Each core 2V is provided with a magneto coil 3V (see FIG. 3) through which a V-phase current passes. Each core 2W is provided with a magneto coil 3W (see FIG. 3) through which a W-phase current passes. Note that the core is also called a pole.

An even number of permanent magnets 4N, 4S are provided at equal angular intervals on the inner peripheral surface of the rotor 4 with the central axis of the stator 2 as the center. The plurality of permanent magnets 4N are attached to the rotor 4 such that N poles thereof are directed to the central axis, and the plurality of permanent magnets 4S are attached to the rotor 4 such that S poles thereof are directed to the central axis. The plurality of permanent magnets 4N and the plurality of permanent magnets 4S are alternately arranged. The permanent magnets 4N are hatched in FIG. 2.

The rotation of the rotor 4 causes each of the permanent magnets 4N, 4S to sequentially face each of the cores 2U, 2V, 2W of the stator 2.

The total number of the permanent magnets 4N, 4S is 2n in the present preferred embodiment, where n is a natural number. In the example of FIG. 2, n is 10. Therefore, the number of the permanent magnets 4N is 10, the number of the permanent magnets 4S is 10, and the total number of the permanent magnets 4N, 4S is 20. In this case, an angular interval between two adjacent permanent magnets 4N, 4S is 18 degrees (=360 degrees/20).

Moreover, the number of the magneto coils 3U, 3V, 3W (the number of the cores 2U, 2V, 2W) is a number excluding a multiple of three, and preferably are 3m−1 or 3m−2, where m is a natural number. The number of the magneto coils 3U, 3V, 3W (the number of the cores 2U, 2V, 2W) is 3n−1 in the present preferred embodiment. In the example of FIG. 2, the number of the magneto coils 3U (the number of the cores 2U) is 5, the number of the magneto coils 3V (the number of the cores 2V) is 5, and the number of the magneto coils 3W (the number of the cores 2W) is 4. Thus, the total number of the magneto coils 3U, 3V, 3W (the total number of the cores 2U, 2V, 2W) is 14.

The U-phase cores 2U are arranged at angular intervals of integral multiples of each angular interval between the permanent magnets 4N, 4S. In other words, the U-phase magneto coils 3U are arranged at the angular intervals of the integral multiples of each angular interval between the permanent magnets 4N, 4S. Excluding the V-phase cores 2V and the W-phase cores 2W, the angular intervals between adjacent U-phase cores 2U preferably are 54 degrees, 72 degrees, 54 degrees, 126 degrees and 54 degrees in the example of FIG. 2.

The V-phase cores 2V are arranged at angular intervals of integral multiples of each angular interval between the permanent magnets 4N, 4S. In other words, the V-phase magneto coils 3V are arranged at the angular intervals of the integral multiples of each angular interval between the permanent magnets 4N, 4S. Excluding the W-phase cores 2W and the U-phase cores 2U, the angular intervals between adjacent V-phase cores 2V preferably are 126 degrees, 54 degrees, 72 degrees, 54 degrees and 54 degrees in the example of FIG. 2.

The W-phase cores 2W are arranged at angular intervals of integral multiples of each angular interval between the permanent magnets 4N, 4S. In other words, the W-phase magneto coils 3W are arranged at the angular intervals of the integral multiples of each angular interval between the permanent magnets 4N, 4S. Excluding the U-phase cores 2U and the V-phase cores 2V, the angular intervals between adjacent W-phase cores 2W preferably are 54 degrees, 126 degrees, 54 degrees, and 126 degrees in the example of FIG. 2.

As described above, the magneto coils 3U, 3V, 3W (the cores 2U, 2V, 2W) are arranged at the unequal angular intervals. That is, at least one angular interval of the fourteen angular intervals between the magneto coils 3U, 3V, 3W (the cores 2U, 2V, 2W) is different from the other angular intervals. In the example of FIG. 2, ten of the fourteen angular intervals between the cores 2U, 2V, 2W are each 24 degrees, and four of the fourteen angular intervals between the cores 2U, 2V, 2W are each 30 degrees.

As shown in FIG. 3, the plurality of magneto coils 3U are connected in series, the plurality of magneto coils 3V are connected in series, and the plurality of magneto coils 3W are connected in series. A series circuit of the magneto coils 3U, a series circuit of the magneto coils 3V and a series circuit of the magneto coils 3W are delta-connected. Note that the series circuit of the magneto coils 3U, the series circuit of the magneto coils 3V and the series circuit of the magneto coils 3W may be star-connected.

The plurality of magneto coils 3U are connected such that phases of the currents passing through the plurality of magneto coils 3U are equal while each magneto coil 3U (core 2U) faces any of the permanent magnets 4N, 4S (the state of FIG. 2). For example, the plurality of magneto coils 3U are connected in series while a direction of turns of the magneto coil 3U facing the permanent magnet 4N and a direction of turns of the magneto coil 3U facing the permanent magnet 4S are opposite to each other as shown in FIG. 3. In this case, one end (an end close to the permanent magnet 4N, 4S) of one magneto coil 3U and another end (an end far from the permanent magnet 4N, 4S) of another magneto coil 3U on one side of the one magneto coil 3U are connected to each other.

The plurality of magneto coils 3V are connected such that phases of the currents passing through the plurality of magneto coils 3V are equal while each magneto coil 3V (the core 2V) faces any of the permanent magnets 4N, 4S. For example, the plurality of magneto coils 3V are connected in series while a direction of turns of the magneto coil 3V facing the permanent magnet 4N and a direction of turns of the magneto coil 3V facing the permanent magnet 4S are opposite to each other as shown in FIG. 3. In this case, one end (an end close to the permanent magnet 4N, 4S) of one magneto coil 3V and another end (an end far from the permanent magnet 4N, 4S) of another magneto coil 3V on one side of the one magneto coil 3V are connected to each other.

Furthermore, the plurality of magneto coils 3W are connected such that phases of the currents passing through the plurality of magneto coils 3W are equal while each magneto coil 3W (the core 2W) faces any of the permanent magnets 4N, 4S. For example, the plurality of magneto coils 3W are connected in series while a direction of turns of the magneto coil 3W facing the permanent magnet 4N and a direction of turns of the magneto coil 3W facing the permanent magnet 4S are opposite to each other as shown in FIG. 3. In this case, one end (an end close to the permanent magnet 4N, 4S) of one magneto coil 3W and another end (an end far from the permanent magnet 4N, 4S) of another magneto coil 3W on one side of the one magneto coil are connected to each other.

In this manner, the phases and directions of the currents passing through the plurality of magneto coils 3U are equal, the phases and directions of the currents passing through the plurality of magneto coils 3V are equal, and the phases and directions of the currents passing through the plurality of magneto coils 3W are equal.

This does not cause the connection among the plurality of magneto coils 3U, the connection among the plurality of magneto coils 3V and the connection among the plurality of magneto coils 3W to be complicated.

Note that the directions of turns of all the magneto coils 3U, 3V, 3W may be the same, and the magneto coils 3U, 3V, 3W facing the permanent magnets 4N may be connected in a different manner from the magneto coils 3U, 3V, 3W facing the permanent magnets 4S. For example, when one magneto coil of one phase faces the permanent magnet 4N and another magneto coil of the same phase facing the permanent magnet 4S is positioned on one side of the one magneto coil, one end of the one magneto coil is connected to one end of the another magneto coil on the same side. In addition, when one magneto coil of one phase faces the permanent magnet 4N and another magneto coil of the same phase facing the permanent magnet 4N is positioned on one side of the one magneto coil, one end of the one magneto coil is connected to another end of the another magneto coil on the opposite side.

The plurality of magneto coils 3U, 3V, 3W (the cores 2U, 2V, 2W) are arranged such that when the central axis of each magneto coil 3U (core 2U) is positioned at the center of any of the permanent magnets 4N, 4S (the state of FIG. 2), the central axis of each magneto coil 3W (core 2W) is in a position shifted by a mechanical angle of about ⅓ of the angular interval between the permanent magnets 4N, 4S in one direction from the center of any of the permanent magnets 4N, 4S, and the central axis of each magneto coil 3V (core 2V) is in a position shifted by a mechanical angle of about ⅔ of the angular interval between the permanent magnets 4N, 4S in the one direction from the center of any of the permanent magnets 4N, 4S.

That is, when the central axis of each magneto coil 3U (core 2U) is positioned at the center of any of the permanent magnets 4N, 4S, the central axis of each magneto coil 3W (core 2W) is in a position shifted by a mechanical angle of about 360 degrees/(3×the number of the permanent magnets 4N, 4S) in one direction from the center of any of the permanent magnets 4N, 4S, and the central axis of each magneto coil 3V (core 2V) is in a position shifted by a mechanical angle of about 2×360 degrees/(3×the number of the permanent magnets 4N, 4S) in the one direction from the center of any of the permanent magnets 4N, 4S.

In the example of FIG. 2, each angular interval between the permanent magnets 4N, 4S preferably is about 18 degrees, for example. The central axis of each core 2U is positioned at the center of any of the permanent magnets 4N, 4S. In this state, the central axis of each core 2W is in a position shifted by about 6 degrees (=18/3), for example, in a counterclockwise direction from the center of any of the permanent magnets 4N, 4S. The central axis of each core 2V is in a position shifted by about 12 degrees (=2×18/3), for example, in the counterclockwise direction from the center of any of the permanent magnets 4N, 4S.

As described above, when the central axis of an arbitrary magneto coil (core) out of the magneto coils 3U, 3V, 3W (cores 2U, 2V, 2W) is positioned at the center of any of the permanent magnets 4N, 4S, the central axis of each of all magneto coils having the same phase as the magneto coil is positioned at the center of any of the permanent magnets 4N, 4S. In this state, the central axis of each of all magneto coils (cores) of another one phase is in a position shifted by a mechanical angle of about 6 degrees, for example, in one direction from the center of any of the permanent magnets 4N, 4S, and the central axis of each of all magneto coils (cores) of still another one phase is in a position shifted by a mechanical angle of about 12 degrees, for example, in the one direction from the center of the any of the permanent magnets 4N, 4S.

As a result, the phases of the currents passing through the magneto coils 3U, the phases of the currents passing through the magneto coils 3V and the phases of the currents passing through the magneto coils 3W are different from one another by 120 degrees. This causes phases of a three-phase alternating current to be balanced.

In the examples of FIGS. 2 and 3, the number of the magneto coils 3U (the number of the cores 2U) and the number of the magneto coils 3V (the number of the cores 2V) are equal, and the number of the magneto coils 3W (the number of the cores 2W) is smaller than each of the number of the magneto coils 3U (the number of the cores 2U) and the number of the magneto coils 3V (the number of the cores 2V). In this case, the number of turns of each magneto coil 3U and the number of turns of each magneto coil 3V are equal, and the number of turns of each magneto coil 3W is larger than each of the number of turns of each magneto coil 3U and the number of turns of each magneto coil 3V.

For example, the numbers of turns of five magneto coils 3U are each 31, the numbers of turns of five magneto coils 3V are each 31, and the numbers of turns of four magneto coils 3W are each 39. Thus, the total number of turns of the five magneto coils 3U is 155, the total number of turns of the five magneto coils 3V is 155, and the total number of turns of the four magneto coils 3W is 156. As described above, the total number of turns of the magneto coils 3U, the total number of turns of the magneto coils 3V, and the total number of turns of the magneto coils 3W are substantially equal, thus causing the electrical generating capacities of the U-phase, V-phase and W-phase to be equalized.

Here, temperature characteristics of the magneto coils of the three-phase magneto generator according to the present preferred embodiment and a three-phase magneto generator of a comparative example were measured.

The three-phase magneto generator of the comparative example is different from the generator 1 according to the present preferred embodiment in the following points.

As described above, the generator 1 according to the present preferred embodiment includes the 20 permanent magnets 4N, 4S and the 14 magneto coils 3U, 3V, 3W, and the magneto coils 3U, 3V, 3W are arranged at unequal angular intervals. That is, the generator 1 according to the present preferred embodiment includes the 2n permanent magnets 4N, 4S and the 3m−1 magneto coils 3U, 3V, 3W, where n=10, m=5.

On the other hand, the generator of the comparative example includes twenty permanent magnets 4N, 4S and fifteen magneto coils 3U, 3V, 3W, and the magneto coils 3U, 3V, 3W are arranged at equal angular intervals. That is, the generator of the comparative example includes 2n permanent magnets 4N, 4S and 3m magneto coils 3U, 3V, 3W.

Figure 4:
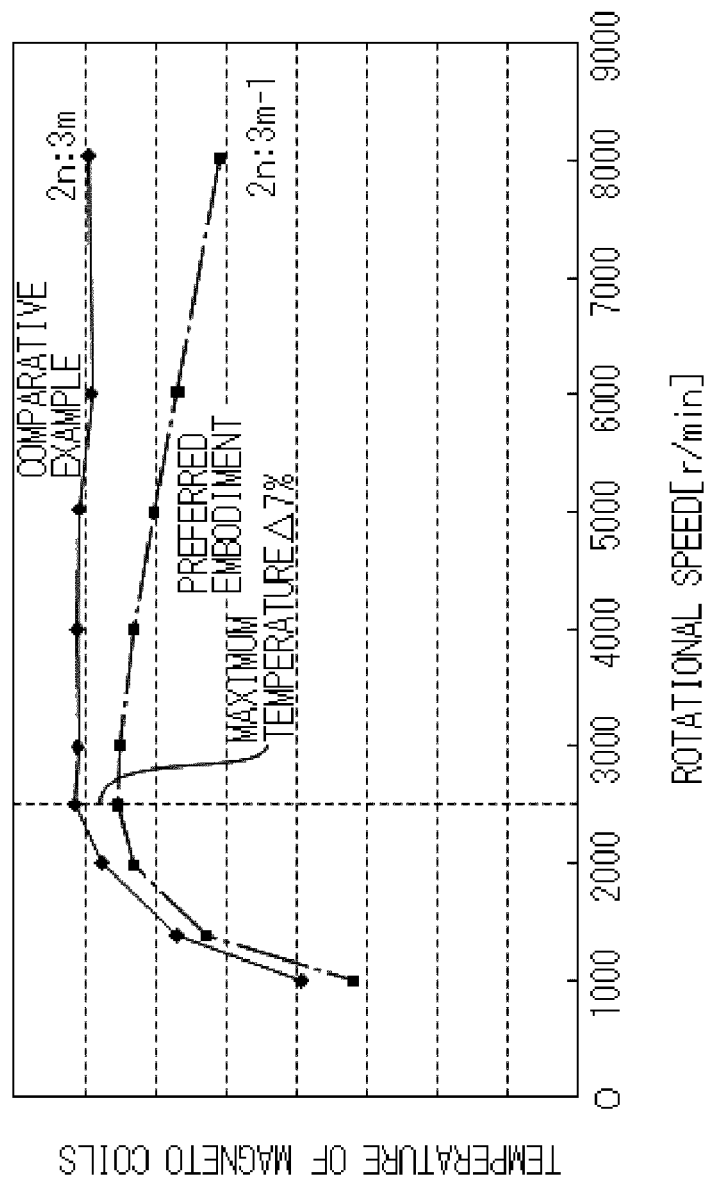
FIG. 4 is a diagram showing results of measurement of temperature characteristics of the magneto coils of the three-phase magneto generator according to the present preferred embodiment and a three-phase magneto generator of a comparative example.

FIG. 4 is a diagram showing results of measurement of the temperature characteristics of the three-phase magneto generator according to the present preferred embodiment and the three-phase magneto generator of the comparative example. In FIG. 4, the ordinate indicates the temperature of the magneto coils, and the abscissa indicates the rotational speed.

Note that output current characteristics of the generator according to the present preferred embodiment and output current characteristics of the generator of the comparative example are set to be equal.

In the generator of the comparative example, the temperature of the magneto coils is maximized when the rotational speed is 2500 r/min, and the temperature is substantially constant in the high rotational speed region.

In the generator 1 according to the present preferred embodiment, the temperature of the magneto coils is maximized when the rotational speed is 2500 r/min, and the temperature gradually decreases with increasing the rotational speed in the high rotational speed region.

The maximum temperature of the magneto coils in the generator 1 according to the present preferred embodiment is lower than that of the magneto coils in the generator of the comparative example by about 7%, for example.

In the generator 1 according to the present preferred embodiment, the number of the magneto coils 3U, 3V, 3W (the number of the cores 2U, 2V, 2W) is not a multiple of three, and the magneto coils 3U, 3V, 3W (the cores 2U, 2V, 2W) are arranged at the unequal angular intervals. Therefore, the interval between adjacent magneto coils is wide in some portions, and the interval between adjacent magneto coils is narrow in other portions. As a result, the good output current characteristics can be maintained and heat generation of the magneto coils 3U, 3V, 3W can be prevented.

In addition, since the number of the permanent magnets 4N, 4S is as many as 2n (preferably 20 in the present preferred embodiment, for example), the output current characteristics are improved in the low rotational speed region, and the output current is suppressed in the high rotational speed region. Accordingly, the sufficient electrical generating capacity is obtained in the low rotational speed region, and regulator elements are prevented from being damaged in the high rotational speed region.

Note that the number of the magneto coils 3U, 3V, 3W may be 3n−2, and the magneto coils 3U, 3V, 3W may be arranged at unequal angular intervals. For example, the number of the magneto coils 3U, 3V, 3W may be 13. Also in this case, the interval between adjacent magneto coils is wide in some portions, and the interval between adjacent magneto coils is narrow in other portions. As a result, the good output current characteristics can be maintained and the heat generation of the magneto coils 3U, 3V, 3W can be prevented.

Iron loss is decreased when the number of the magneto coils 3U, 3V, 3W (the number of the cores 2U, 2V, 2W) is 3m−1 or 3m−2 as compared with a case where the number of the magneto coils 3U, 3V, 3W (the number of the cores 2U, 2V, 2W) is 3m. Thus, the heat generation of the magneto coils 3U, 3V, 3W is prevented.

Furthermore, since a lower portion of the rotor 4 is immersed in the engine oil 10 held in the lower portion within the casing 5, the engine oil 10 is agitated by the rotation of the rotor 4 and the engine oil 10 is splashed on the magneto coils 3U, 3V, 3W at an upper portion of the stator 2. This causes the magneto coils 3U, 3V, 3W to be easily cooled. As a result, the overall heat generation of the generator 1 is further reduced.

While the number of the permanent magnet 4N, 4S is 20, and the number of the magneto coils 3U, 3V, 3W is 14 in the example of FIG. 2, the present invention is not limited to this. The practical number of the permanent magnets 4N, 4S is in a range from 18 to 24, and the practical number of the magneto coils 3U, 3V, 3W is in a range from 13 to 23.

For example, the number of the magneto coils 3U, 3V, 3W may be 13. In this case, 3m−2, where m=5. The respective numbers of the magneto coils 3U, 3V, 3W may be 5, 4 and 4, for example.

The number of the magneto coils 3U, 3V, 3W may be 16. In this case, 3m−2, where m=6. For example, the respective numbers of the magneto coils 3U, 3V, 3W may be 6, 5 and 5.

The number of the magneto coils 3U, 3V, 3W may be 17. In this case, 3m−1, where m=6. For example, the respective numbers of the magneto coils 3U, 3V, 3W may be 6, 6 and 5.

The number of the magneto coils 3U, 3V, 3W may be 19. In this case, 3m−2, where m=7. For example, the respective numbers of the magneto coils 3U, 3V, 3W may be 7, 6 and 6.

The number of the magneto coils 3U, 3V, 3W may be 20. In this case, 3m−1, where m=7. For example, the respective numbers of the magneto coils 3U, 3V, 3W may be 7, 7 and 6.

The number of the magneto coils 3U, 3V, 3W may be 22. In this case, 3m−2, where m=8. For example, the respective numbers of the magneto coils 3U, 3V, 3W may be 8, 7 and 7.

The number of the magneto coils 3U, 3V, 3W may be 23. In this case, 3m−1, where m=8. For example, the respective numbers of the magneto coils 3U, 3V, 3W may be 8, 8 and 7.

Also in these cases, the plurality of magneto coils 3U, 3V, 3W are arranged such that when the central axis of each magneto coil 3U is positioned at the center of any of the permanent magnets 4N, 4S, the central axis of each magneto coil 3V is in a position shifted by a mechanical angle of about 360 degrees/(3×the number of the permanent magnets 4N, 4S), for example, in one direction from the center of any of the permanent magnets 4N, 4S, and the central axis of each magneto coil 3W is in a position shifted by a mechanical angle of about 2×360 degrees/(3×the number of the permanent magnets 4N, 4S), for example, in the one direction from the center of any of the permanent magnets 4N, 4S.

Other Preferred Embodiments

Figure 5:
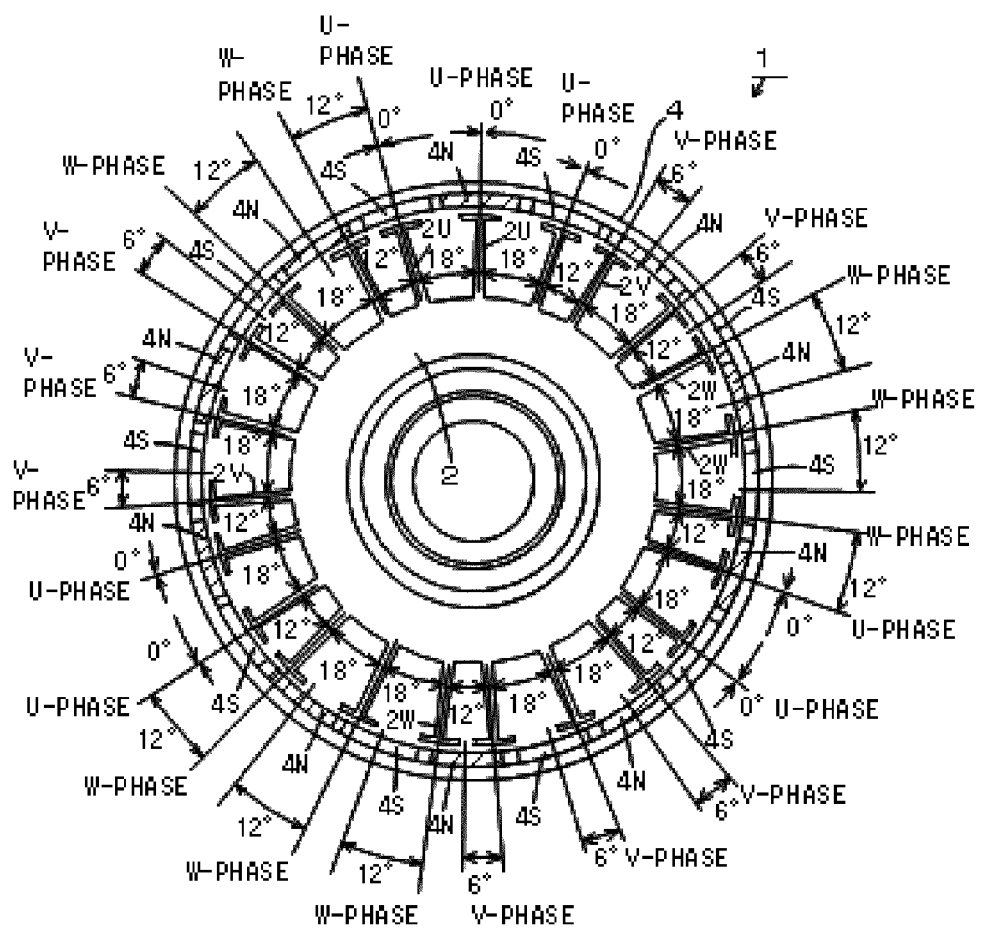
FIG. 5 is a front view of a three-phase magneto generator according to another preferred embodiment of the present invention.

FIG. 5 is a front view of a three-phase magneto generator according to another preferred embodiment of the present invention. The magneto coils are not shown in FIG. 6.

In the present preferred embodiment, the total number of the permanent magnets 4N, 4S is 20, and the total number of the magneto coils 3U, 3V, 3W (the number of the cores 2U, 2V, 2W) is 23. The number of the magneto coils 3U (the number of the cores 2U) is 7, the number of the magneto coils 3V (the number of the cores 2V) is 8, and the number of the magneto coils 3W (the number of the cores 2W) is 8. An angular interval between two adjacent permanent magnets 4N, 4S preferably is about 18 degrees (=360 degrees/20), for example.

When the central axis of an arbitrary magneto coil (core) out of the magneto coils 3U, 3V, 3W (the cores 2U, 2V, 2W) is positioned at the center of any of the permanent magnets 4N, 4S, the central axis of each of all magneto coils (cores) having the same phase as the magneto coil (core) is positioned at the center of any of the permanent magnets 4N, 4S. In this state, the central axis of each of all magneto coils (cores) of another one phase is in a position shifted by a mechanical angle of about 6 degrees, for example, in one direction from the center of any of the permanent magnets 4N, 4S, and the central axis of each of all magneto coil (cores) of still another one phase is in a position shifted by a mechanical angle of about 12 degrees, for example, in the one direction from the center of any of the permanent magnets 4N, 4S.

Also in the generator 1 according to the present preferred embodiment, the number of the magneto coils 3U, 3V, 3W (the number of the cores 2U, 2V, 2W) is not a multiple of three, and the magneto coils 3U, 3V, 3W (the cores 2U, 2V, 2W) are arranged at unequal angular intervals. Therefore, the interval between adjacent magneto coils is wide in some portions, and the interval between adjacent magneto coils is narrow in other portions. As a result, the output current characteristics can be maintained and the heat generation of the magneto coils 3U, 3V, 3W can be prevented.

Still Another Preferred Embodiment

FIG. 6 is a front view of a three-phase magneto generator according to still another preferred embodiment of the present invention. In FIG. 6, the magneto coils are not shown.

In the present preferred embodiment, the total number of the permanent magnets 4N, 4S is 18, and the total number of the magneto coils 3U, 3V, 3W (the total number of the cores 2U, 2V, 2W) is 13. The number of the magneto coils 3U (the number of the cores 2U) is 5, the number of the magneto coils 3V (the number of the cores 2V) is 4, and the number of the magneto coils 3W (the number of the cores 2W) is 4. An angular interval between two adjacent permanent magnets 4N, 4S preferably is about 20 degrees (=360 degrees/18), for example.

When the central axis of an arbitrary magneto coil (core) out of the magneto coils 3U, 3V, 3W (the cores 2U, 2V, 2W) is positioned at the center of any of the permanent magnets 4N, 4S, the central axis of each of all magneto coils (cores) having the same phase as the magneto coil (core) is positioned at the center of any of the permanent magnets 4N, 4S. In this state, the central axis of each of all magneto coils (cores) of another one phase is in a position shifted by a mechanical angle of about 6.66 degrees, for example, in one direction from the center of any of the permanent magnets 4N, 4S, and the central axis of each of all magneto coils (cores) of still another one phase is in a position shifted by a mechanical angle of about 13.34 degrees, for example, in the one direction from the center of any of the permanent magnets 4N, 4S.

Also in the generator 1 according to the present preferred embodiment, the number of the magneto coils 3U, 3V, 3W (the number of the cores 2U, 2V, 2W) is not a multiple of three, and the magneto coils 3U, 3V, 3W (the cores 2U, 2V, 2W) are arranged at unequal angular intervals. Therefore, the interval between adjacent magneto coils is wide in some portions, and the interval between adjacent magneto coils is narrow in other portions. As a result, the output current characteristics can be maintained and the heat generation of the magneto coils 3U, 3V, 3W can be prevented.

Motorcycle Including the Three-Phase Magneto Generator

Figure 7:
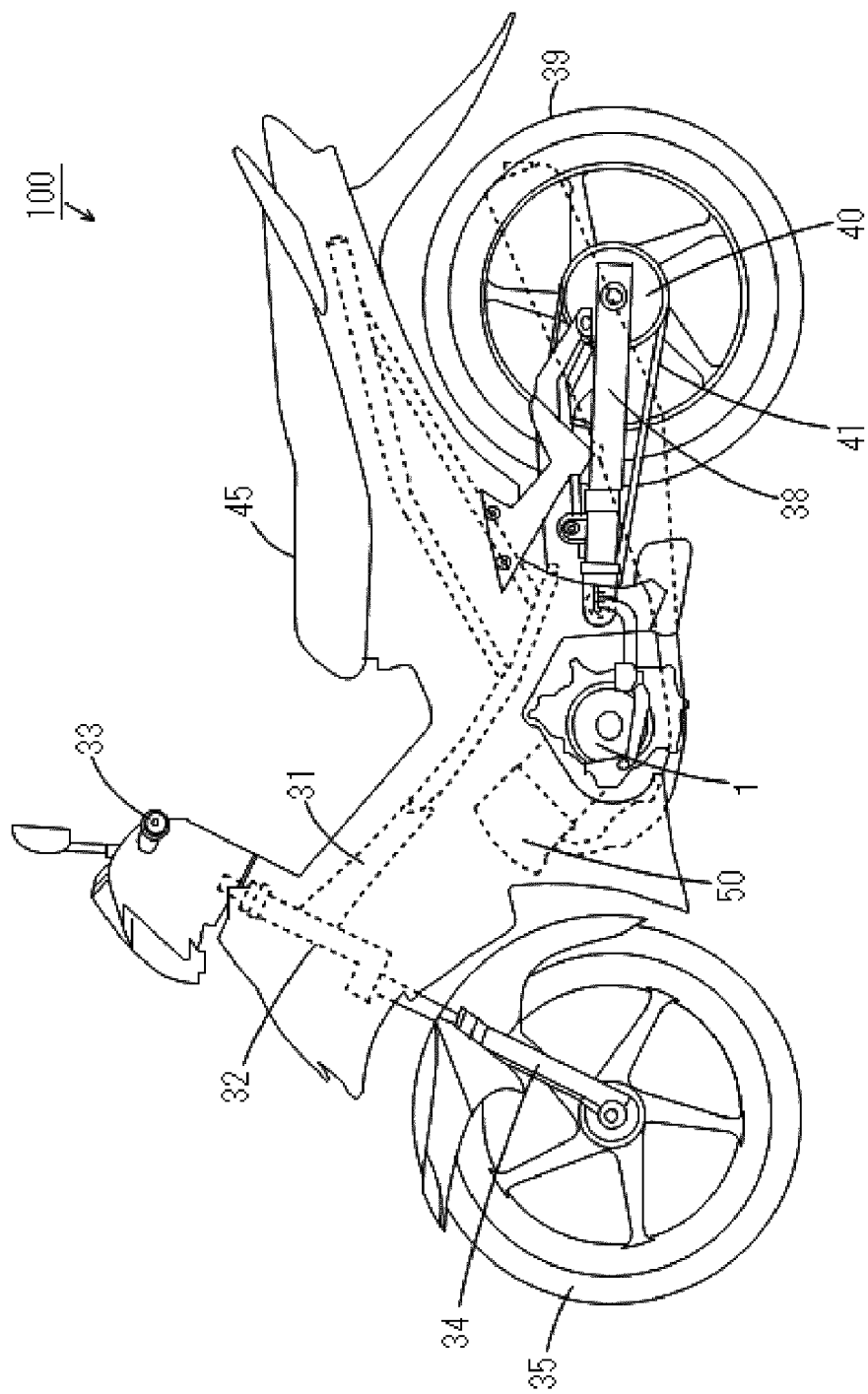
FIG. 7 is a side view of a motorcycle including the three-phase magneto generator according to the preferred embodiments of the present invention.

FIG. 7 is a side view of the motorcycle including the three-phase magneto generator according to one of the various preferred embodiments of the present invention.

In the motorcycle 100 shown in FIG. 7, a head pipe 32 is provided at the front end of a main body frame 31. A handle 33 is provided at the upper end of the head pipe 32. A front fork 34 is attached to the head pipe 32. In this state, the front fork 34 can be rotated in a predetermined angular range with the axial center of the head pipe 32 as the center. A front wheel 35 is rotatably supported at the lower end of the front fork 34.

An engine 50 is provided at the center of the main body frame 31. The generator 1 is attached to the engine 50. The casing 5 (FIG. 1) of the generator 1 is fixed to the crankcase of the engine 50 or the main body frame 31, and the rotor 4 (FIG. 1) of the generator 1 is integrally rotated with the crankshaft 9 (FIG. 1) of the engine 50.

A rear arm 38 is connected to the main body frame 31 so as to extend to the rear of the engine 50. A rear wheel 39 and a rear wheel driven sprocket 40 are rotatably held by the rear arm 38. A chain 41 is attached to the rear wheel driven sprocket 40.

In the generator 1 used in the motorcycle 100 of FIG. 7, the output current characteristics can be maintained and the heat generation of the magneto coils can be prevented. This results in higher performance and higher functions of an electrical system of the motorcycle 100.

OTHER EXAMPLES OF THE TRANSPORT APPARATUS

While the generator 1 according to the preferred embodiments is preferably applied to the scooter-type motorcycle 100 as an example of the transport apparatus, the present invention is not limited to this. The generator 1 may be applied to motorcycles of other types (a saddle-straddling type motorcycle, for example) than the scooter type.

In addition, the generator 1 can be applied to various transport apparatuses such as a three-wheeled motor vehicle, a four-wheeled motorcycle and a craft.

Correspondences Between Claim Elements and Elements in Preferred Embodiments

In the following paragraphs, non-limiting examples of correspondences between various elements recited in the claims below and those described above with respect to various preferred embodiments of the present invention are explained.

In the foregoing preferred embodiments, the permanent magnets 4N, 4S are examples of a plurality of permanent magnets, and the magneto coils 3U, 3V, 3W are examples of a plurality of magneto coils. One of the permanent magnets 4N, 4S is an example of a first permanent magnet, the other of the permanent magnets 4N, 4S is an example of a second permanent magnet, any magneto coils of the magneto coils 3U, 3V, 3W are examples of a plurality of first magneto coils, other magneto coils of the magneto coils 3U, 3V, 3W are examples of a plurality of second magneto coils, and still other magneto coils of the magneto coils 3U, 3V, 3W is an example of a plurality of third magneto coils. Any of the U-phase, the V-phase and the W-phase is an example of a first phase, another of the U-phase, the V-phase, and the W-phase is an example of a second phase, and still another of the U-phase, the V-phase, and the W-phase is an example of a third phase.

The main body frame 31 is an example of a main body, and the rear wheel 39 is an example of a drive unit.

As each of various elements recited in the claims, various other elements having configurations or functions described in the claims can be also used.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A three-phase magneto generator comprising:
   a stator;
   a rotor rotatably arranged relative to the stator;
   a plurality of permanent magnets provided at the rotor at equal angular intervals; and
   a plurality of magneto coils provided at the stator at unequal angular intervals; wherein
   the number of the plurality of magneto coils is not a multiple of three;
   the plurality of magneto coils include a plurality of first coils through which first phase currents pass, a plurality of second coils through which second phase currents pass, and a plurality of third coils through which third phase currents pass;
   the plurality of first coils are arranged and connected such that phases of the currents passing through the plurality of first coils are equal, the plurality of second coils are arranged and connected such that phases of the currents passing through the plurality of second coils are equal, and the plurality of third coils are arranged and connected such that phases of the currents passing through the plurality of third coils are equal; and
   the number of the plurality of first coils and the number of the plurality of second coils are equal, the number of the plurality of third coils is less than each of the number of the plurality of first coils and the number of the plurality of second coils, and the number of turns of each of the plurality of first coils and the number of turns of each of the plurality of second coils are equal, and the number of turns of each of the plurality of third coils is more than each of the number of turns of each of the plurality of first coils and the number of turns of each of the plurality of second coils.

2. The three-phase magneto generator according to claim 1, wherein the plurality of first coils are arranged at angular intervals, each of which is an integral multiple of the angular interval between the permanent magnets, the plurality of first coils are connected such that the phases of the currents passing through the plurality of first coils are equal while each of the first coils is opposite to any of the plurality of permanent magnets;
   the plurality of second coils are arranged in positions that are different from positions of the plurality of first coils at angular intervals, each of which is an integral multiple of the angular interval between the permanent magnets, and the plurality of second coils are connected such that the phases of the currents passing through the plurality of second coils are equal while each of the second coils is opposite to any of the plurality of permanent magnets; and
   the plurality of third coils are arranged in positions that are different from the positions of the plurality of first and second coils at angular intervals, each of which is an integral multiple of the angular interval between the permanent magnets, and the plurality of third coils are connected such that the phases of the currents passing through the plurality of third coils are equal while each of the third coils is opposite to any of the plurality of permanent magnets.

3. The three-phase magneto generator according to claim 1, wherein the plurality of magneto coils are arranged such that when each of the plurality of first coils is opposite to any of the plurality of permanent magnets, each of the plurality of second coils is in a position shifted in one direction by an angle of about 1/3 of the angular interval between the permanent magnets from a position opposite to any of the plurality of permanent magnets; and each of the plurality of third coils is in a position shifted in the one direction by an angle of about 2/3 of the angular interval between the permanent magnets from a position opposite to any of the plurality of permanent magnets.

4. The three-phase magneto generator according to claim 1, wherein:
   the plurality of permanent magnets include a plurality of first permanent magnets having N poles being opposite to the plurality of magneto coils and a plurality of second permanent magnets having S poles being opposite to the plurality of magneto coils;
   a direction of the turns of each of the plurality of first coils being opposite to any of the plurality of first permanent magnets is different from a direction of the turns of each of the plurality of first coils being opposite to any of the plurality of second permanent magnets while each of the plurality of first coils is opposite to any of the plurality of permanent magnets;
   a direction of the turns of each of the plurality of second coils being opposite to any of the plurality of first permanent magnets is different from a direction of the turns of each of the plurality of second coils being opposite to any of the plurality of second permanent magnets while each of the plurality of second coils is opposite to any of the plurality of permanent magnets; and
   a direction of the turns of each of the plurality of third coils being opposite to any of the plurality of first permanent magnets is different from a direction of the turns of each of the plurality of third coils being opposite to any of the plurality of second permanent magnets while each of the plurality of third coils is opposite to any of the plurality of permanent magnets.

5. The three-phase magneto generator according to claim 1, wherein the number of the plurality of permanent magnets is 2n, and the number of the plurality of magneto coils is 3m−1 or 3m−2, where each of n and m is a natural number.

6. A transport apparatus comprising:
   a main body;
   an engine provided in the main body;
   a drive unit arranged to move the main body by rotation of the engine; and
   a three-phase magneto generator driven by the rotation of the engine; wherein
   the three-phase magneto generator includes:
      a stator;
      a rotor rotatably arranged relative to the stator;
      a plurality of permanent magnets provided at the rotor at equal angular intervals; and
      a plurality of magneto coils provided at the stator at unequal angular intervals; wherein
      the number of the plurality of magneto coils is not a multiple of three;
      the plurality of magneto coils including a plurality of first coils through which first phase currents pass, a plurality of second coils through which second phase currents pass, and a plurality of third coils through which third phase currents pass;
      the plurality of first coils being arranged and connected such that phases of the currents passing through the plurality of first coils are equal, the plurality of second coils being arranged and connected such that phases of the currents passing through the plurality of second coils are equal, and the plurality of third coils being arranged and connected such that phases of the currents passing through the plurality of third coils are equal; and the number of the plurality of first coils and the number of the plurality of second coils are equal, the number of the plurality of third coils is less than each of the number of the plurality of first coils and the number of the plurality of second coils, and the number of turns of each of the plurality of first coils and the number of turns of each of the plurality of second coils are equal, and the number of turns of each of the plurality of third coils is more than each of the number of turns of each of the plurality of first coils and the number of turns of each of the plurality of second coils.

7. A three-phase magneto generator comprising:
a stator;
a rotor rotatably arranged relative to the stator;
a plurality of permanent magnets provided at the rotor at equal angular intervals; and
a plurality of magneto coils provided at the stator at unequal angular intervals; wherein
the number of the plurality of magneto coils is not a multiple of three;
the plurality of magneto coils include a plurality of first coils through which first phase currents pass, a plurality of second coils through which second phase currents pass, and a plurality of third coils through which third phase currents pass;
the plurality of first coils are arranged and connected such that phases of the currents passing through the plurality of first coils are equal, the plurality of second coils are arranged and connected such that phases of the currents passing through the plurality of second coils are equal, and the plurality of third coils are arranged and connected such that phases of the currents passing through the plurality of third coils are equal; and
the number of the plurality of second coils and the number of the plurality of third coils are equal, and the number of the plurality of second coils and the number of the plurality of third coils are each less than the number of the plurality of first coils, and the number of turns of each of the plurality of second coils and the number of turns of each of the plurality of third coils are equal, and the number of turns of each of the plurality of second coils and the number of turns of each of the plurality of third coils are each more than a number of turns of each of the plurality of first coils.

8. The three-phase magneto generator according to claim 7, wherein the plurality of first coils are arranged at angular intervals, each of which is an integral multiple of the angular interval between the permanent magnets, the plurality of first coils are connected such that the phases of the currents passing through the plurality of first coils are equal while each of the first coils is opposite to any of the plurality of permanent magnets;
the plurality of second coils are arranged in positions that are different from positions of the plurality of first coils at angular intervals, each of which is an integral multiple of the angular interval between the permanent magnets, and the plurality of second coils are connected such that the phases of the currents passing through the plurality of second coils are equal while each of the second coils is opposite to any of the plurality of permanent magnets; and
the plurality of third coils are arranged in positions that are different from the positions of the plurality of first and second coils at angular intervals, each of which is an integral multiple of the angular interval between the permanent magnets, and the plurality of third coils are connected such that the phases of the currents passing through the plurality of third coils are equal while each of the third coils is opposite to any of the plurality of permanent magnets.

9. The three-phase magneto generator according to claim 7, wherein the plurality of magneto coils are arranged such that when each of the plurality of first coils is opposite to any of the plurality of permanent magnets, each of the plurality of second coils is in a position shifted in one direction by an angle of about ⅓ of the angular interval between the permanent magnets from a position opposite to any of the plurality of permanent magnets; and each of the plurality of third coils is in a position shifted in the one direction by an angle of about ⅔ of the angular interval between the permanent magnets from a position opposite to any of the plurality of permanent magnets.

10. The three-phase magneto generator according to claim 7, wherein:
the plurality of permanent magnets include a plurality of first permanent magnets having N poles being opposite to the plurality of magneto coils and a plurality of second permanent magnets having S poles being opposite to the plurality of magneto coils;
a direction of the turns of each of the plurality of first coils being opposite to any of the plurality of first permanent magnets is different from a direction of the turns of each of the plurality of first coils being opposite to any of the plurality of second permanent magnets while each of the plurality of first coils is opposite to any of the plurality of permanent magnets;
a direction of the turns of each of the plurality of second coils being opposite to any of the plurality of first permanent magnets is different from a direction of the turns of each of the plurality of second coils being opposite to any of the plurality of second permanent magnets while each of the plurality of second coils is opposite to any of the plurality of permanent magnets; and
a direction of the turns of each of the plurality of third coils being opposite to any of the plurality of first permanent magnets is different from a direction of the turns of each of the plurality of third coils being opposite to any of the plurality of second permanent magnets while each of the plurality of third coils is opposite to any of the plurality of permanent magnets.

11. The three-phase magneto generator according to claim 7, wherein the number of the plurality of permanent magnets is 2n, and the number of the plurality of magneto coils is 3m−1 or 3m−2, where each of n and m is a natural number.

12. A transport apparatus comprising:
a main body;
an engine provided in the main body;
a drive unit arranged to move the main body by rotation of the engine; and
a three-phase magneto generator driven by the rotation of the engine; wherein
the three-phase magneto generator includes:
a stator;
a rotor rotatably arranged relative to the stator;
a plurality of permanent magnets provided at the rotor at equal angular intervals; and
a plurality of magneto coils provided at the stator at unequal angular intervals; wherein
the number of the plurality of magneto coils is not a multiple of three;
the plurality of magneto coils including a plurality of first coils through which first phase currents pass, a plurality of second coils through which second phase currents pass, and a plurality of third coils through which third phase currents pass;

the plurality of first coils being arranged and connected such that phases of the currents passing through the plurality of first coils are equal, the plurality of second coils being arranged and connected such that phases of the currents passing through the plurality of second coils are equal, and the plurality of third coils being arranged and connected such that phases of the currents passing through the plurality of third coils are equal; and the number of the plurality of second coils and the number of the plurality of third coils are equal, and the number of the plurality of second coils and the number of the plurality of third coils are each less than the number of the plurality of first coils, and the number of turns of each of the plurality of second coils and the number of turns of each of the plurality of third coils are equal, and the number of turns of each of the plurality of second coils and the number of turns of each of the plurality of third coils are each more than the number of turns of each of the plurality of first coils.

* * * * *